(12) United States Patent
Butler

(10) Patent No.: US 6,460,248 B2
(45) Date of Patent: Oct. 8, 2002

(54) METHOD OF SHEET METAL CONSTRUCTION FOR THIN BOOM TUBE EXHAUST PIPES

(76) Inventor: Boyd L. Butler, 1672 E. 10770 South, Sandy, UT (US) 84092

( * ) Notice: Subject to any disclaimer, the term of this patent is extended or adjusted under 35 U.S.C. 154(b) by 0 days.

(21) Appl. No.: 09/943,820

(22) Filed: Aug. 31, 2001

(65) Prior Publication Data

US 2002/0023346 A1 Feb. 28, 2002

Related U.S. Application Data

(62) Division of application No. 09/392,398, filed on Sep. 9, 1999, now Pat. No. 6,283,162.

(51) Int. Cl.⁷ ................................................. B23P 15/00
(52) U.S. Cl. ...................................... 29/890.08; 24/428
(58) Field of Search ............................ 29/890.08, 428; 138/177, 178, 109; 180/309

(56) References Cited

U.S. PATENT DOCUMENTS 4,114,715 A    9/1978  Theron
5,269,650 A   12/1993  Benson
5,701,737 A * 12/1997  Branik et al. ................ 181/282
5,868,172 A    2/1999  Graves
5,992,470 A   11/1999  Redman
6,009,914 A    1/2000  Castano
6,018,946 A *  2/2000  Matsumoto .............. 29/890.08

* cited by examiner

Primary Examiner—I. Cuda-Rosenbaum
(74) Attorney, Agent, or Firm—Mallinckrodt & Mallinckrodt

(57) ABSTRACT

A method of construction for flattened single or dual inlet boom tube exhaust pipes from sheet metal for use on race cars, such as stock cars which race on oval tracks. The construction of the boom tube exhaust pipes comprise single or dual slightly flattened circular inlets which lead exhaust gasses into a flattened profile body constructed of formed sheet metal half shells, with the inlets at or above the lower plane of the body. One or more formed sheet metal structural ribs extend through the body and into the inlets and one or more spacer ribs support the half shells within the body.

10 Claims, 9 Drawing Sheets

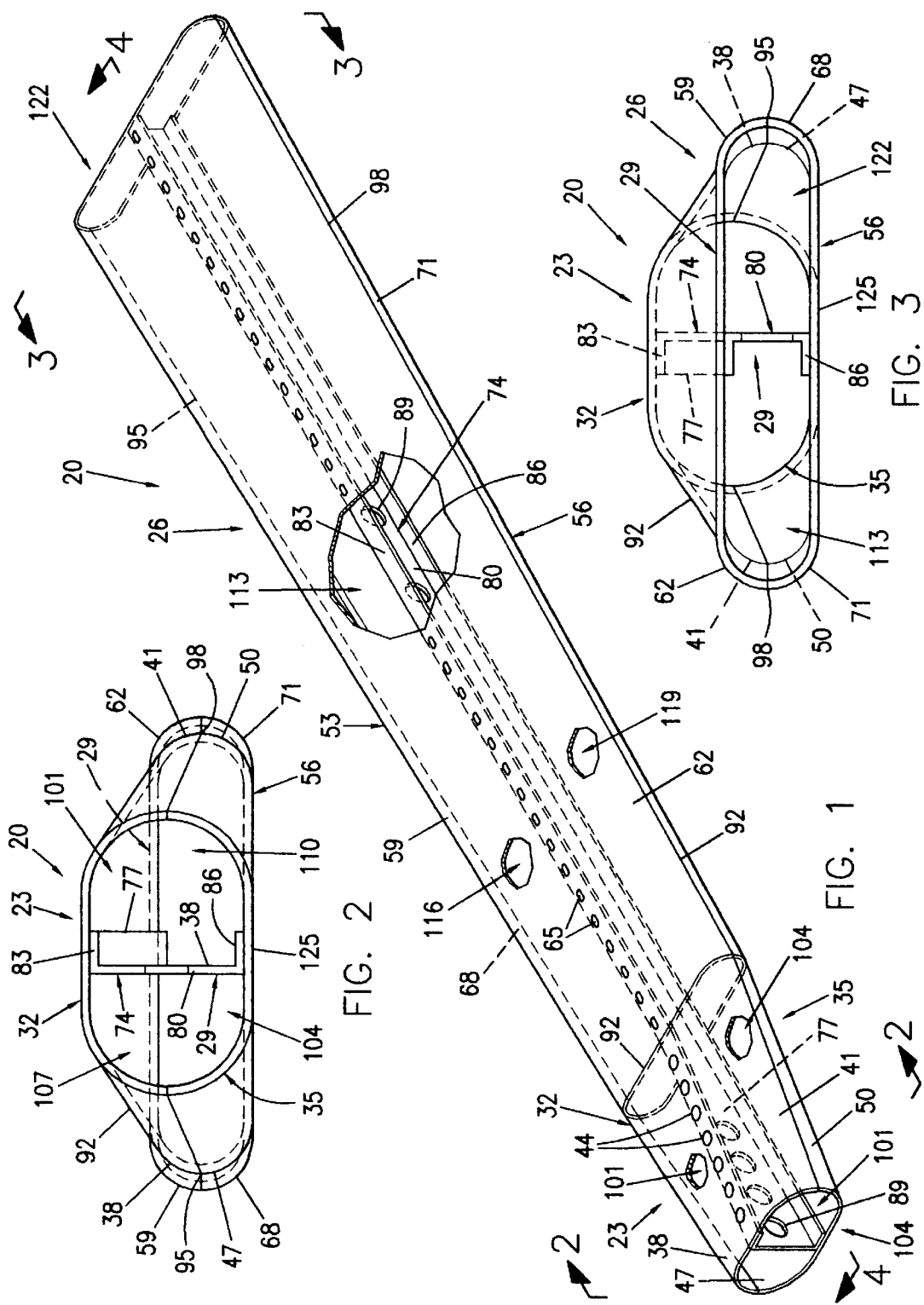

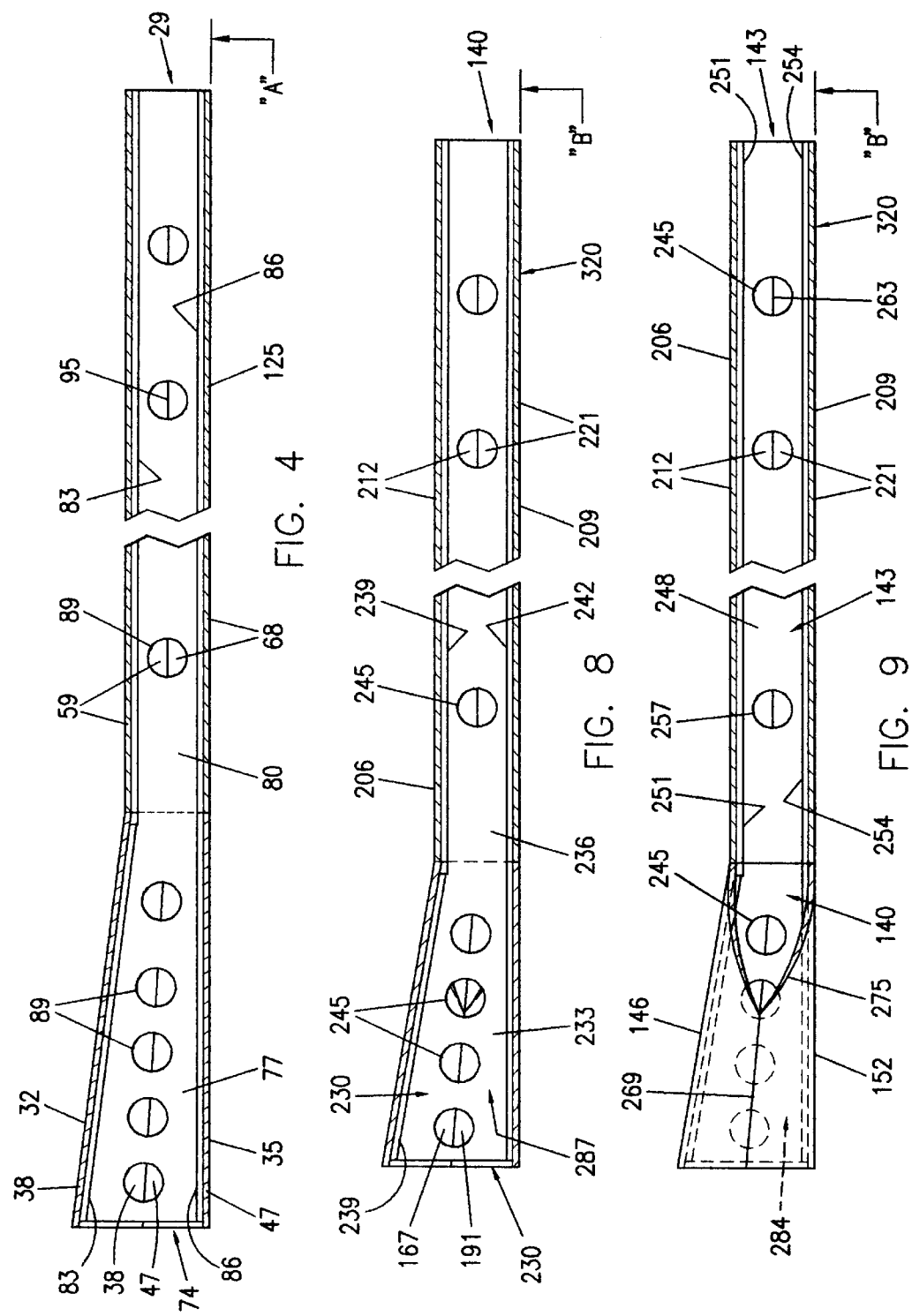

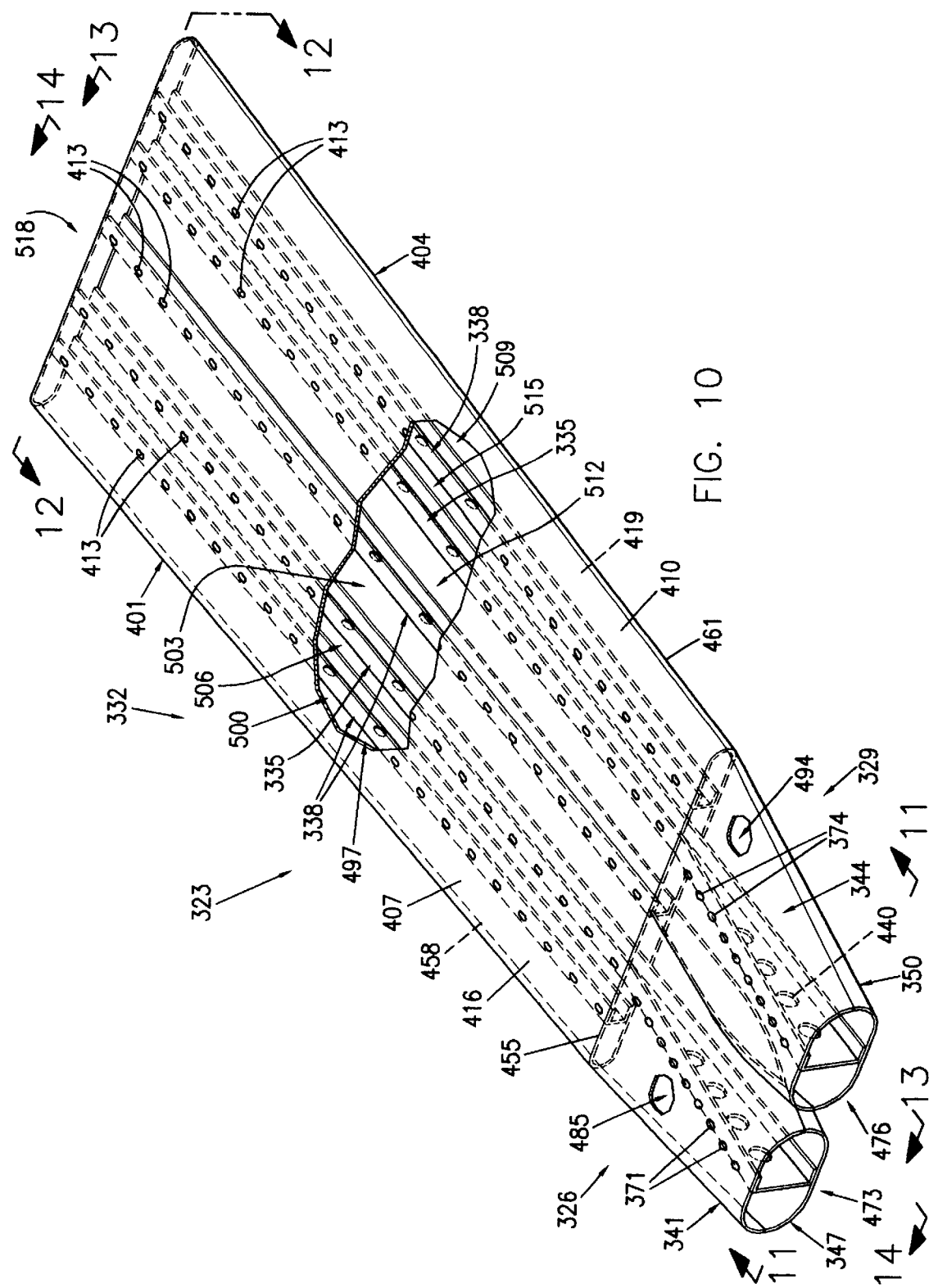

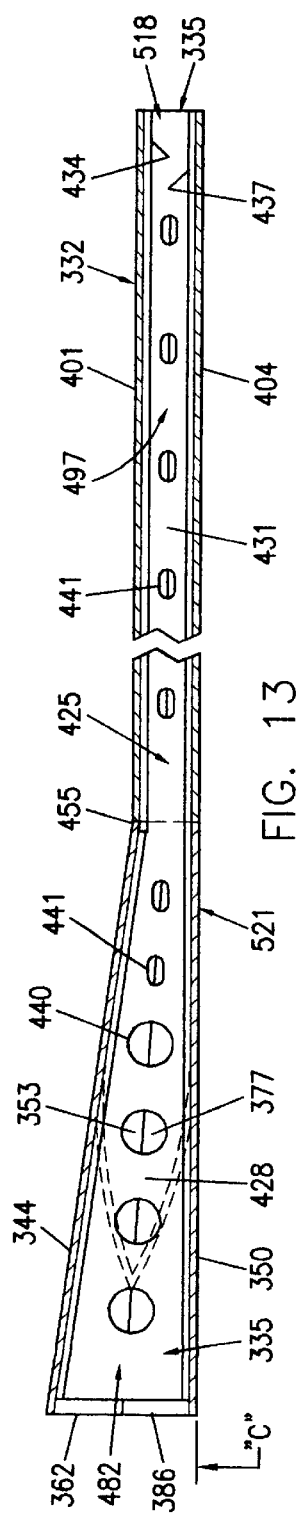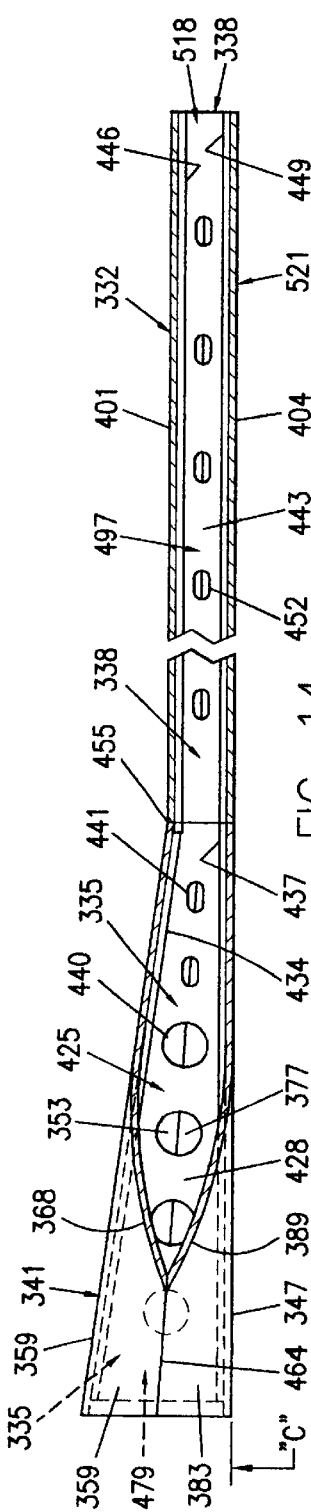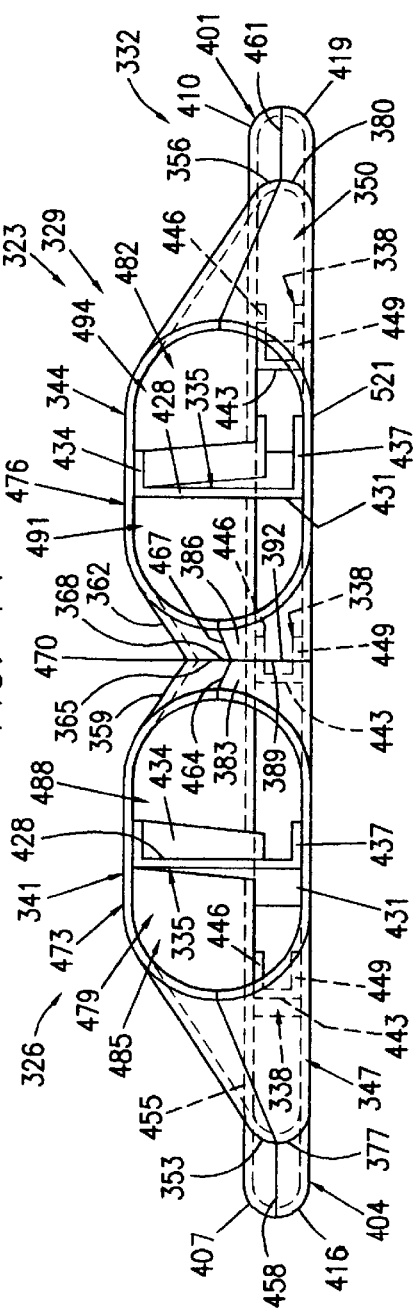

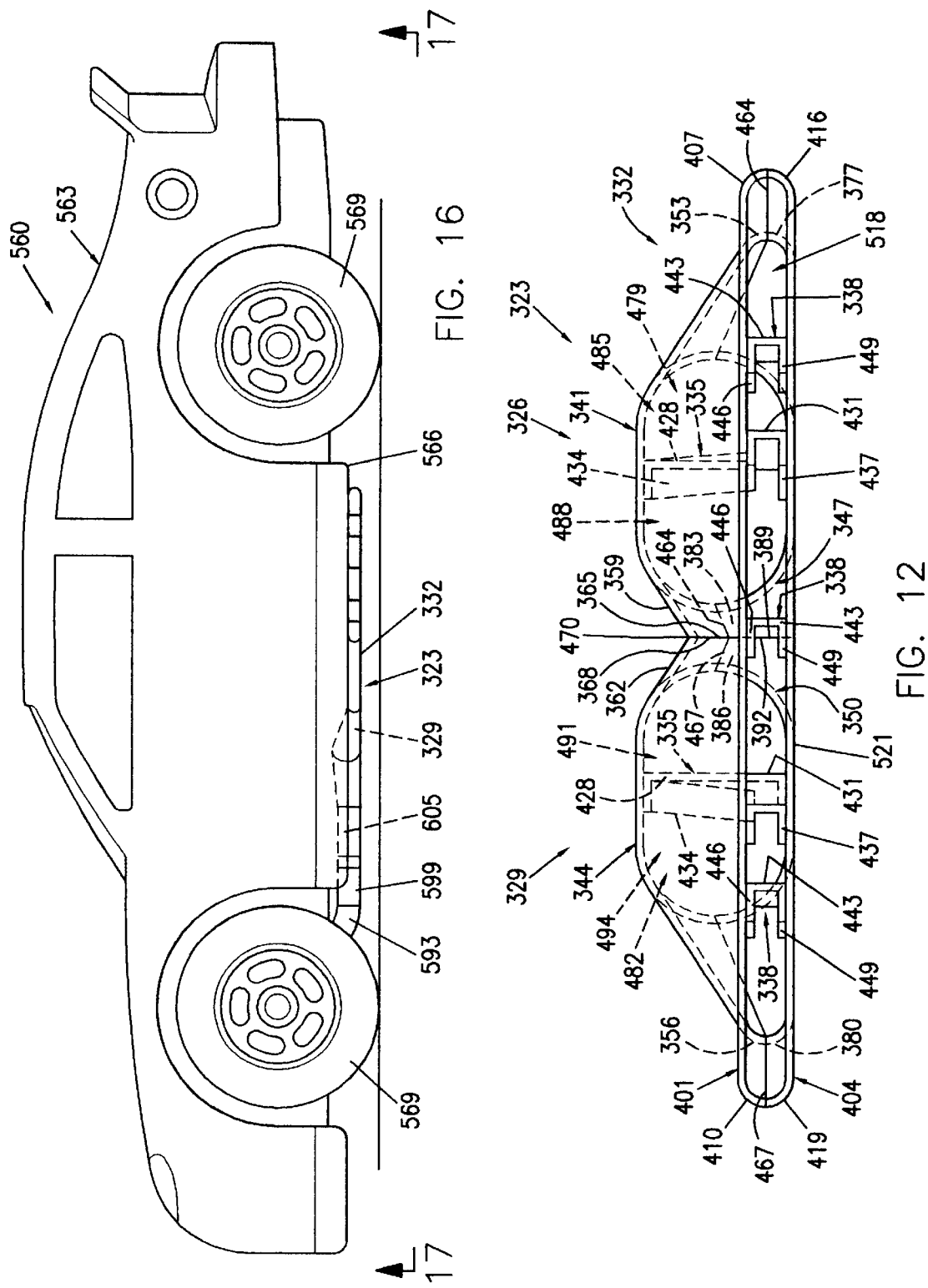

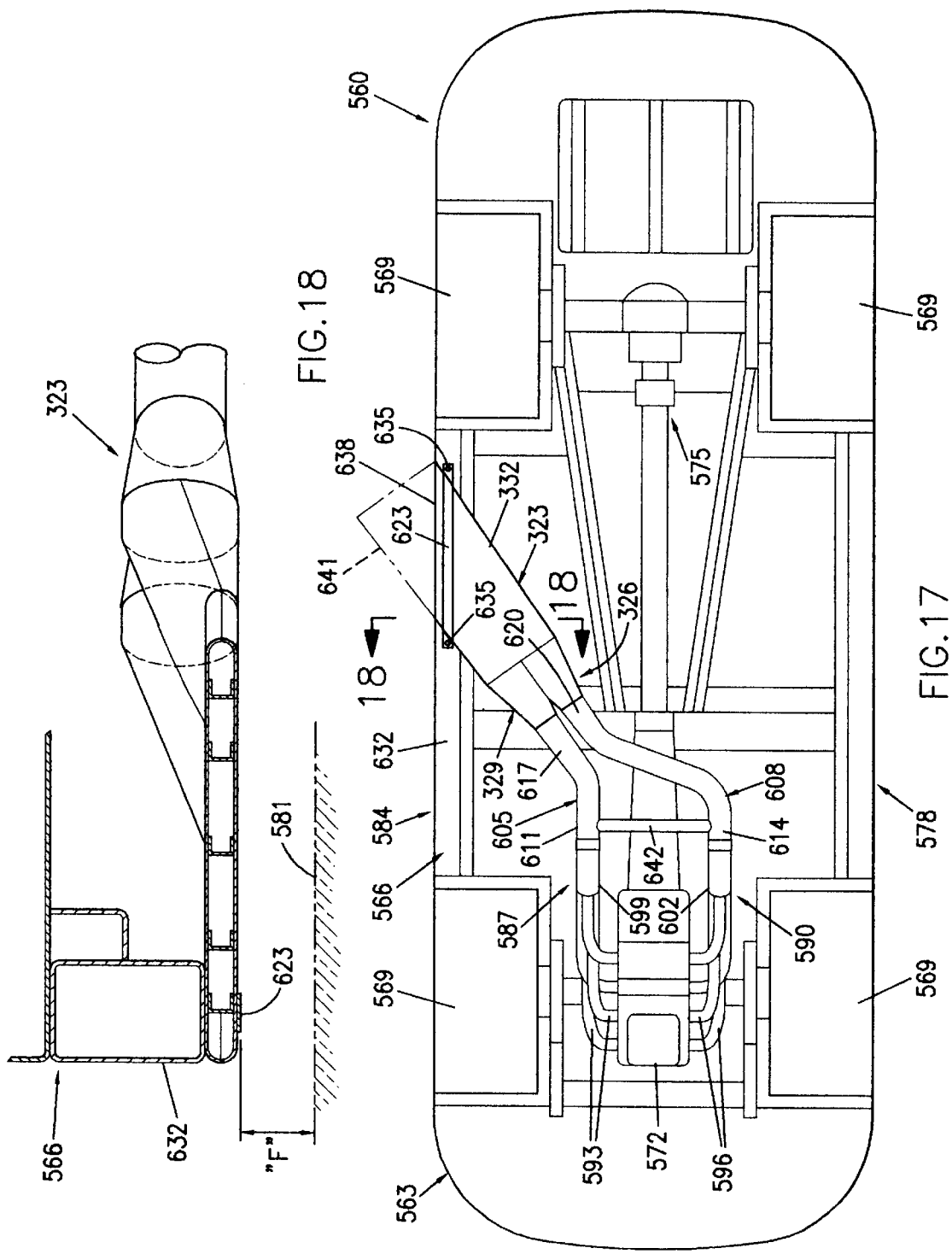

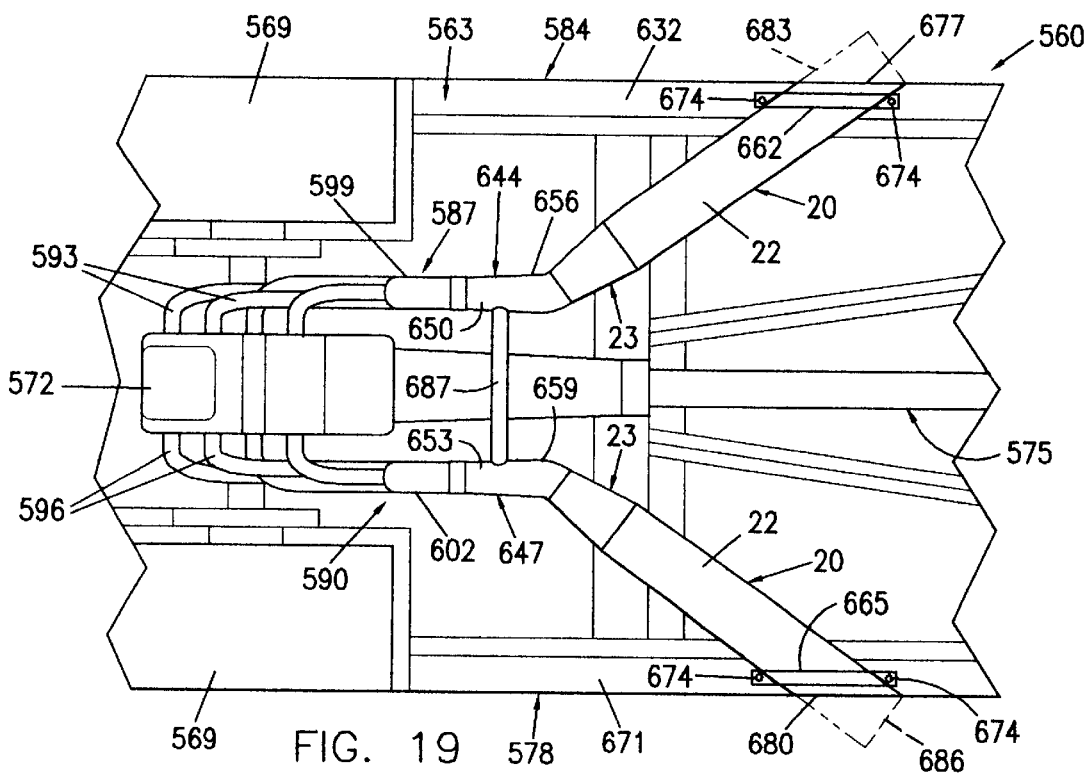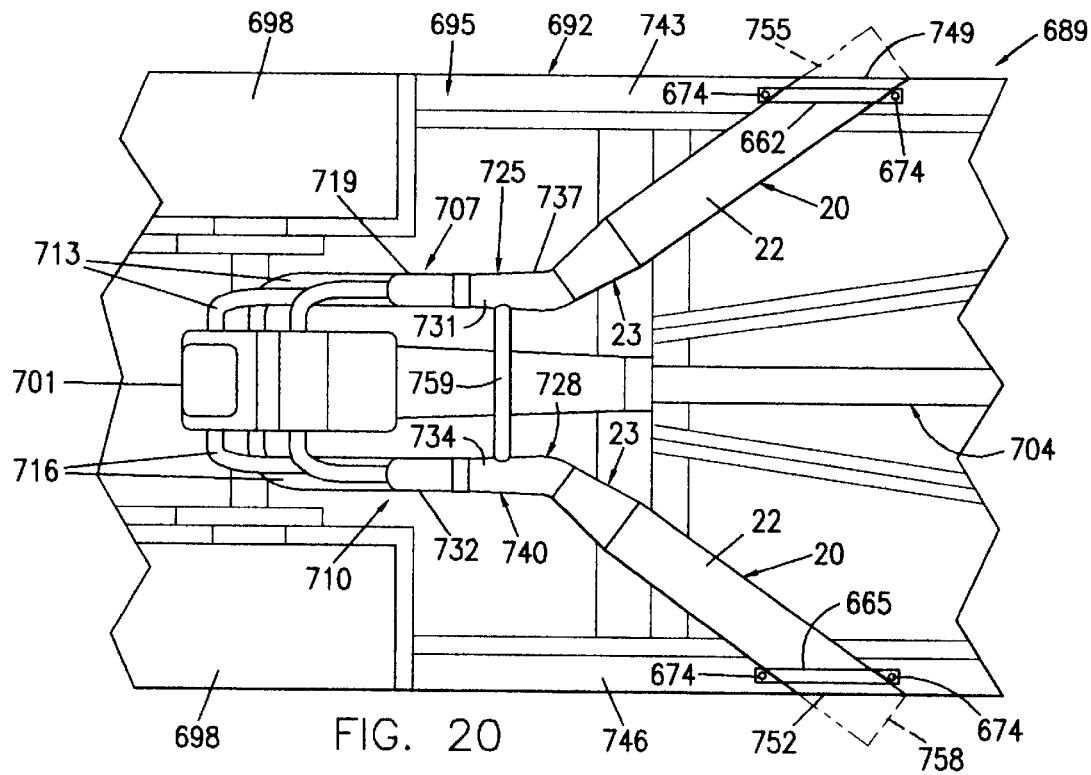

METHOD OF SHEET METAL CONSTRUCTION FOR THIN BOOM TUBE EXHAUST PIPES

RELATED APPLICATION

Figure 5:
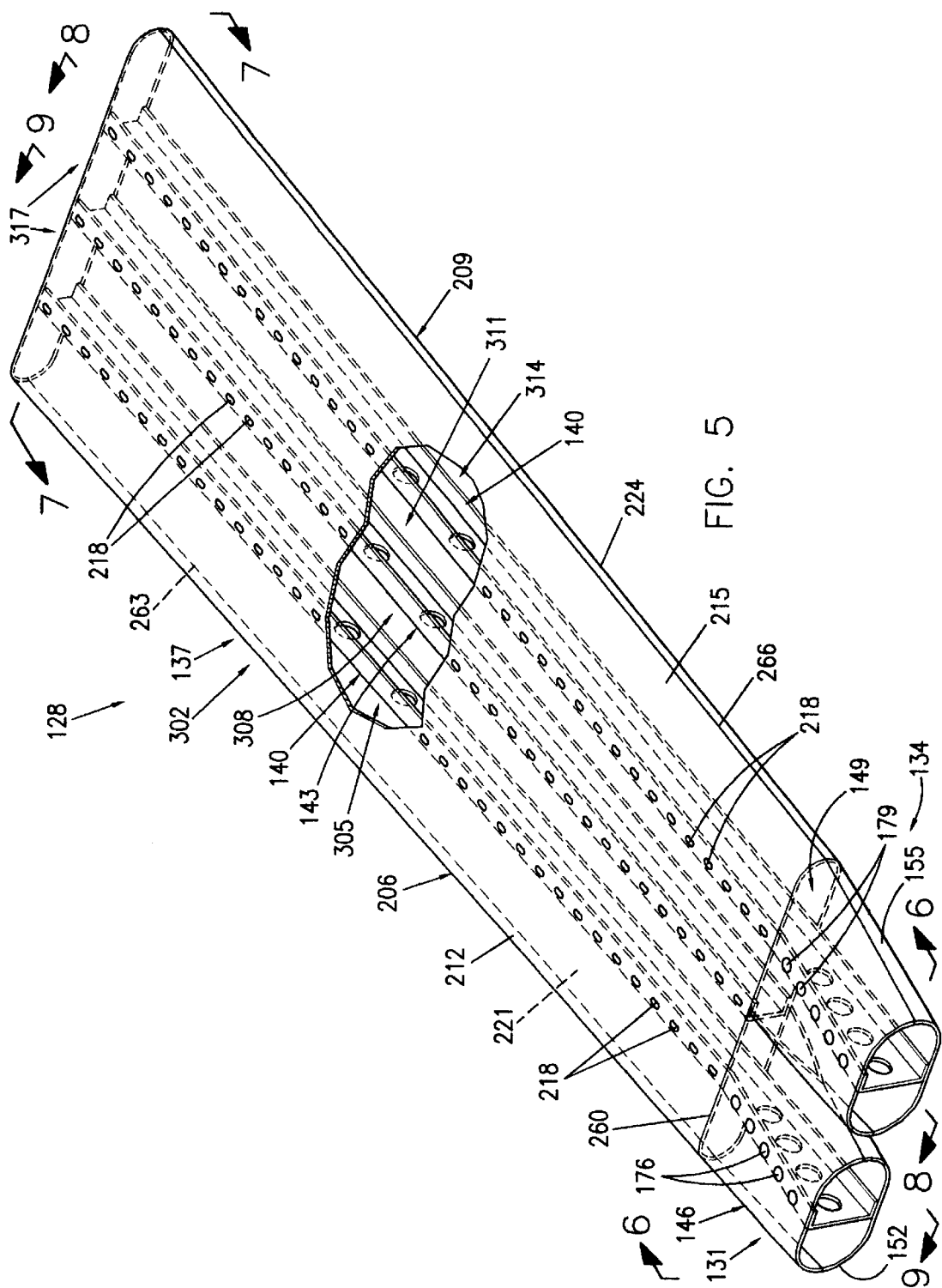

This application is a Divisional of my U.S. patent application Ser. No. 09/392,398 filed Sep. 9, 1999 entitled "Thin Boom Tube Exhaust Pipes, Method of Sheet Metal Construction Thereof, and Exhaust Systems Which Utilize Such Exhaust Pipes for Increased Ground Clearance on Race Cars", now U.S. Pat. No. 6,283,162.

BACKGROUND OF THE INVENTION

1. Field

The invention is in the field of exhaust systems for automobiles, and more specifically thin exhaust pipes for increased ground clearance on racing cars used on oval tracks such as stock cars.

2. State of the Art

Race cars used in automobile racing are typically constructed such that only a minimal amount of clearance is maintained between the underside of the car and the surface of the roadway or track. This is done to lower the center of gravity of the vehicle so as to improve vehicle handling and resistance to rolling over, and to minimize the drag on the car due to air passing thereunder. Likewise, such race cars typically have very stiff suspension systems which do not allow the vehicle to travel as great a distance up and down nor side-to-side as a standard production car allowing the use of less ground clearance. One of the problems encountered in lowering the race car closer to the race track is providing sufficient clearance for the vehicle exhaust system which is one of the lowest hanging components of a typical car, including race cars.

The problem is particularly acute on cars which race on oval race tracks such as stock cars. The exhaust pipes of such stock cars typically exit toward one or both sides of the car so as to minimize the length of the exhaust pipes and the resulting exhaust gas back pressure which back pressure lowers engine power output and overall engine performance. As such, the minimum ground clearance of the exhaust system typically occurs where the exhaust pipes cross under the longitudinally-extending main frame members of the chassis at the sides of the vehicle. Stock cars typically race on oval tracks in a counter-clockwise rotational direction with centrifugal force causing the body and chassis of the car to lean toward the outside of the turn or toward the right side of the car. Therefore, the ground clearance on the right side of the car is less during cornering and the greatest ground clearance results on the left side of the car during such cornering. Also, banked tracks can induce high downward loads to the suspension system of stock cars requiring additional ground clearance. In an effort to increase the ground clearance of the exhaust system on stock cars, thin profile boom tube exhaust pipes were developed which extend at a rearward, laterally outwardly-directed angle from the secondary exhaust pipes under the main frame members of the chassis. The outlet end of such boom tube exhaust pipe is typically manufactured in a squared-off or right angle end configuration and trimmed at installation to match exit angle and the side of the particular vehicle.

The construction of prior art boom tube exhaust pipes typically takes several forms. A first type of prior art boom tube includes a thin profile, generally flattened sheet metal body having a pair of spaced, parallel flat upper and lower sheet metal pieces and a pair of elongate, U-shaped cross-section sheet metal side pieces welded to respective side edges of the upper and lower sheet metal pieces so as to form a generally flattened tubular body. The upper and lower sheet metal pieces can be tapered so as to form a laterally tapered body which allows the exhaust gasses to expand while travelling therethrough. The upper and lower sheet metal pieces are typically interconnected by a plurality of short rods welded into staggered mating holes in such upper and lower sheet metal pieces. The rods are an attempt to minimize vibration of the broad upper and lower half shells which vibration can cause increased exhaust gas back pressure, resonance and increased noise, and metal fatigue. The boom tube exhaust pipe further includes a single funnel shaped inlet or a pair there of which is welded to one end of the generally flattened tubular body to connect with the secondary exhaust pipe or pipes of the vehicle. Such inlets typically comprise a longitudinally split thin walled metal tube, the respective halves of which are partially flattened, more so at one end than the other end, and each longitudinally welded at the edges thereof to a pair of upper and lower tapered flat plates, the narrower edge thereof being adjacent the less-flattened ends of the respective half tubes so as to form a generally funnel shaped inlet with a somewhat flattened circular inlet end and a generally flattened profile outlet end. Alternatively, such inlets can comprise a thin walled metal tube into the respective ends of which are forced appropriately shaped arbors or forms which stretch and form the tube into a somewhat flattened circular shaped inlet end and a generally flattened profile outlet end. Such boom tube exhaust pipe is expensive to manufacture due to the multitude of rods and welding involved and is still prone to metal fatigue due to the increased stresses in the half shells at the respective holes therethrough and due to the increased brittleness of the metal of the half shells and rods due to the heat applied during welding thereof.

A second type of prior art boom tube exhaust pipe comprises a large diameter, thin walled steel tube which is generally flattened so as to form a thin profile, generally flattened tubular body. The upper and lower portions of the tubular body can be interconnected by a plurality of rods as explained for the first version prior art boom tube exhaust pipe. A single funnel shaped inlet or a pair thereof of similar construction as that of the first version prior art boom tube is welded to one end of the flattened tubular body to connect with the secondary exhaust pipe or pipes of the vehicle. The tubular body of such boom tube exhaust pipe does not taper outwardly from the inlet end to the outlet end due to fabrication from a tube such that exhaust gasses cannot expand while moving therethrough, causing increased exhaust gas back pressure and suffers from the same disadvantages as the first version prior art boom tube exhaust pipe.

A third type of prior art boom tube takes the form of a rectangular extruded steel tube to which a pair of elongate U-shaped cross-section sheet metal side pieces are welded to the sides thereof to form a thin profile, generally flattened tubular body having three elongate passageways therein. A plurality of exhaust crossover holes are typically drilled or milled through the walls of the tube to allow crossover flow of exhaust gasses between the elongate passageways. A single funnel shaped inlet or a pair thereof of similar construction as that of the first version prior art boom tube is welded to one end of the flattened tubular body to connect the secondary exhaust pipe or pipes of the vehicle to direct the exhaust gasses into the ends of the respective tubes. A plurality of such rectangular tubes (or square tubes) can be welded together side-by-side in place of the single rectangular tube with the sheet metal side pieces welded to the two outermost tubes to form a thin profile, generally flattened tubular body of greater width than using a single rectangular tube. A plurality of exhaust crossover holes are typically drilled or milled through the walls of the tubes to allow crossover flow of exhaust gasses between the elongate passageways. A single funnel shaped inlet or a pair thereof is welded to one end of the flattened tubular body to connect the secondary exhaust pipe or pipes of the vehicle to direct the exhaust gasses into the ends of the respective tubes. While such boom tube exhaust pipe is more fatigue resistant than the sheet metal, the weight thereof is greater, the exhaust gas crossover tubes must typically be drilled or milled rather than less expensive punching thereof, and the body is not tapered such that exhaust gasses cannot expand while traveling therethrough resulting in increased exhaust gas back pressure.

Such prior art boom tube exhaust pipes can be constructed such that the inlet is at or above a lower plane of the body thereof so as to maximize ground clearance. Likewise, exhaust systems comprising a pair of headers each including a plurality of primary exhaust pipes which connect at one end thereof to the cylinder block of an internal combustion engine at respective exhaust outlet ports thereof and at opposite ends thereof which converge into a single merge collector, a pair of secondary exhaust pipes which connect to the outlet of the respective merge collectors, and one or two boom tube exhaust pipes are used in auto racing. Such exhaust systems can be made and mounted to a race car such that the entire exhaust system including the inlets of the boom tube exhaust pipes, are at or above the lower plane of the bodies of the boom tube exhaust pipes to maximize ground clearance of the exhaust system.

SUMMARY OF THE INVENTION

The invention firstly comprises a flattened profile exhaust pipe, or boom tube exhaust pipe for attachment to the end of a secondary exhaust pipe or exhaust pipe header assembly leading exhaust gasses away from the engine of a motor vehicle. The boom tube exhaust pipe mounts to the bottom portion of the frame or chassis of the motor vehicle typically adjacent the side of the vehicle and provides improved ground clearance between the exhaust pipe and the surface of the ground.

The boom tube exhaust pipe is of generally tubular configuration, comprising a tubular inlet having a first end of mating configuration for attachment to a secondary exhaust pipe or to an exhaust pipe header assembly, having an inlet opening for receiving exhaust gasses therefrom of generally circular or slightly flattened circular shape with the secondary exhaust pipe or exhaust pipe header assembly having a mating shape, the tubular inlet tapering from the first end to a second, thin profile, generally flattened end, and a tubular body of generally flattened shape corresponding to the second end of the tubular inlet, which tubular body extends therefrom and which terminates at an outlet opening for expelling the exhaust gasses into the atmosphere. As such, the bend radius of the respective side portions of the tubular inlet typically decreases uniformly from the first to second end thereof unlike prior art inlets. The flattened body can include a bottom surface lying generally in a plane with the bottom of the tubular inlet at or above the lower plane in a mounted position on the motor vehicle allowing all of the other pipes of the exhaust system lie at or above such plane so as to maximize ground clearance. The body can be flared laterally outwardly from the tubular inlet to the outlet opening so as to allow the exhaust gasses to expand while moving through the body yet without decreasing the ground clearance of the boom tube exhaust pipe. A structural rib can extend generally longitudinally through the body into the tubular inlet, which structural rib spans between and is affixed to the body juxtaposed an upper and a lower inside surface of the body, the portion within the inlet being tapered so as to also span between and is affixed to the inlet juxtaposed an upper and a lower inside surface of the tubular inlet so as to provide support to the tubular inlet and body. A plurality of holes can extend through the structural rib to allow exhaust gasses to flow between elongate passageways formed on each side thereof by the structural rib, the tubular inlet, and the body. The structural rib can comprise a web interconnecting respective upper and lower legs or flanges which extend laterally therefrom, such as in a C-shaped channel cross-section, which structural rib can be plug welded to the tubular inlet and the body through a plurality of holes such as round holes or slots through the tubular inlet and the body. The exhaust pipe can include a second tubular inlet of similar construction to the first laterally adjacent the first tubular inlet for attachment to a second secondary exhaust pipe. A second structural rib of similar configuration to the first structural rib can extend generally longitudinally through the body and into the second inlet which vertically spans between and is affixed to the inlet and the body juxtaposed an upper and a lower inside surface of the tubular inlet and the body like the first structural rib so as to provide support therebetween. A center spacer rib can extend generally longitudinally through the body generally laterally centered therein between the respective inlets and structural ribs. A pair of lateral spacer ribs can also be included which extend generally longitudinally through the body, each disposed laterally outside a respective structural rib. The spacer ribs provide further support to the body, reducing vibration and resulting fatigue failure of the metal of the body. On the dual inlet versions, laterally adjacent portions of the inlets can be vertically cut so as to mate or merge together laterally and be welded at the periphery therebetween to place the inlets closer together.

The invention further comprises boom tube exhaust pipes constructed from standard sheet metal which can be sheared, punched, and formed on standard hand operated punch presses and breaks or other comparable press to allow low cost, low volume production thereof as well as on high volume Computer Numerically Controlled (CNC) programmable punch presses and multiple station automated progressive stamping machines. The tubular inlet and body comprise a pair of sheet metal half shells which are welded together such as at respective peripheral seams. The half shells can comprise respective upper and lower half shells each of which can comprise inlet and body halves which are generally laterally welded together. The structural rib comprises a piece of sheet metal formed so as to have a longitudinally-extending web which interconnects respective laterally outwardly bent upper and lower legs or flanges which extend generally normally therefrom, such as forming a C-shaped channel cross-section. The portion of the structural rib which extends into the inlet is tapered so as to span between an upper and a lower inside surface of the inlet, such tapered portion being formed such as by splitting the upper and/or the lower leg or flange and forming at an angle relative to the remainder thereof. A plurality of punched holes can extend through the web of the structural rib to allow exhaust gasses to flow therethrough. The spacer ribs are constructed in a similar manner from sheet metal but without the tapered inlet portion. The structural ribs and spacer ribs can be plug welded to the half shells through a plurality of holes such as round holes or slots through the respective half shells. Single or dual inlet boom tube exhaust pipes can be made using such construction. On the dual inlet versions, laterally adjacent portions of the inlet halves of the upper and lower half shells can be vertically cut so as to mate or merge together laterally and be welded at the periphery between the inlet halves to place the inlets closer together.

The invention further comprises exhaust systems which include the boom tube exhaust pipes of the invention, such exhaust systems being for use on motor vehicles powered by an internal combustion engine having multiple power cylinders. Such exhaust systems comprise a pair of exhaust pipe header assemblies each of which include a plurality of primary exhaust pipes each connectable at a first end thereof to the engine block at a respective power cylinder exhaust port and a merge collector into which respective opposite ends of the primary exhaust pipes converge and are welded, a pair of transition pipes each having a first end connectable to one of the merge collectors and each having a second end, and a single boom tube exhaust pipe having a pair of inlets, or a pair of boom tube exhaust pipes each having a single inlet. The second ends of the transition pipes are connectable to the respective inlets of the single or dual inlet boom tube exhaust pipes. The single inlet version diverges to laterally opposite sides of the motor vehicle and the dual inlet version exits to one side of the motor vehicle.

The invention further comprises a method of construction of a boom tube exhaust pipe from standard sheet metal, comprising the steps of providing a pair of upper and lower half shells of formed sheet metal which include an inlet portion, a body portion, and an outer periphery, providing an elongate rib of formed sheet metal having a web which interconnects a pair of respective upper lower legs or flanges which extend laterally outwardly therefrom, placing the rib generally longitudinally within the half shells, welding the rib to the respective upper and lower half shells, and welding the outer peripheries of the half shells together. The method can be practiced wherein the welding of the rib to the respective upper and lower half shells is of the resistance spot welding type, or by using half shells each of which include a plurality of longitudinally extending plug weld holes such as round holes or slots punched therethrough and plug welding the rib to the respective upper and lower half shells through the plug weld holes. The half shells can comprise upper and lower half shells. Each of the upper and lower half shells can comprise separate inlet and body halves and the method further include welding the inlet and body halves of the respective upper and lower half shells together. The method can include construction of dual inlet boom tube exhaust pipes having a pair of structural ribs. The inlet halves of the upper and lower half shells can be made from separate pieces of sheet metal and can be vertically cut so as to mate or merge together laterally and the inner periphery between the inlets halves of the upper and lower half shells welded together. The method can include construction of a boom tube exhaust pipe having a center spacer rib and/or a pair of lateral spacer ribs each disposed laterally outside one of the respective structural ribs.

The single and dual inlet boom tube exhaust pipes of the invention, exhaust systems which include such exhaust pipes, and the methods of construction thereof can include boom tube exhaust pipes which are also acoustic mufflers, all of which this invention further comprises. In this regard, my previously issued U.S. Pat. No. 5,824,972 issued to me Oct. 20, 1998 titled "Acoustic Muffler" is hereby incorporated by reference into this patent application. As such the tubular inlet or inlets and in particular the flattened tubular body of the boom tube exhaust pipe comprise the casing of the muffler and a plurality of spiral acoustic traps disposed therein provide the acoustic attenuation. The specific configurations of the combined boom tube exhaust pipe acoustic muffler include any of those disclosed in my prior "Acoustic Muffler" patent, with a single longitudinally diagonally disposed row of acoustic traps being preferred in both the single and the dual inlet versions of the boom tube exhaust pipe acoustic muffler. In such configuration as well as in the other configurations thereof, any such structural ribs and/or spacer ribs can include longitudinal gaps between which the spiral acoustic traps can extend. Such boom tube exhaust pipe acoustic mufflers can also include metering screens, deflectors such as a V-shaped inlet deflector, and perforated metering plates, or any other such components disclosed in my prior "Acoustic Muffler" patent. Such spiral acoustic traps can be affixed to the casing such as by fillet welding, plug welding, or resistance spot welding. The spiral acoustic traps can include one or more upper and lower locator tabs which are integral with or affixed to the spiral acoustic traps and which extend vertically upwardly and downwardly through corresponding generally rectangular or arcuate rectangular holes through the upper and lower walls of the casing or half shells. Such holes serve to locate and retain the spiral acoustic traps during assembly. Such tabs can be bent over upon assembly and are affixed to the casing such as by welding. Alternatively, such tabs can comprise bent ninety degree bent tabs integral with or separate pieces affixed to the spiral acoustic traps, which bent tabs fit juxtaposed the upper and lower surfaces of the casing, which tabs can be welded in a similar manner to the structural ribs, spacer ribs, and spiral acoustic traps. Such locating tabs and corresponding holes in the casing or half shells, and bent tabs can likewise be used on the metering screens, deflectors, perforated metering plates, and on any other such components used in the construction of the boom tube exhaust pipe acoustic muffler.

The boom tube exhaust pipe acoustic muffler can include a plurality of flat, curved, V-shaped, or otherwise bent baffle plates which route the exhaust gasses in a circuitous route therethrough so as to provide acoustic attenuation so as to lower the level of noise from the motor vehicle. Examples of such baffle arrangements in single and dual inlet versions include laterally extending, longitudinally spaced flat baffle plates which alternately extend from opposite sides of the casing with respective gaps between the free ends thereof and the opposite side portion of the casing for exhaust gasses to pass thereby so as to route the exhaust gases side-to-side in a generally horizontal plane. Such baffle plates can comprise laterally extending ribs of similar construction to the structural ribs and spacer ribs disclosed herein. The ends of the respective ribs which contact the side portions of the casing can be arcuate so as to match closely thereto without significant exhaust gas leakage therebetween. A second example of such baffle arrangement comprises a longitudinally extending series of alternating generally laterally disposed V-shaped plates and pairs of flat plates, the V-shaped plates disposed generally along the longitudinal centerline of the casing pointing toward the tubular inlet with gaps between the respective ends thereof and the side portions of the casing to allow exhaust gasses to pass thereby. The flat plates extend from respective side portions of the casing in a generally coplanar fashion, with a gap between the free ends thereof at the longitudinal centerline of the casing to allow exhaust gasses to pass thereby. As such, the exhaust gasses are generally split into two streams which pass by opposite ends of each V-shaped baffle plate and remix in the gap between the flat plates.

Other such examples of such arrangements of baffle plates include such as for the dual inlet version a pair of such above examples, comprising two complete sets of baffle plates as described in the previous examples, one generally centered about the longitudinal centerline of each of the respective inlets, the innermost plates of which can terminate at the center spacer rib rather than the side portion of casing or simply terminate such that exhaust gasses can pass therearound.

THE DRAWINGS

Figure 6:
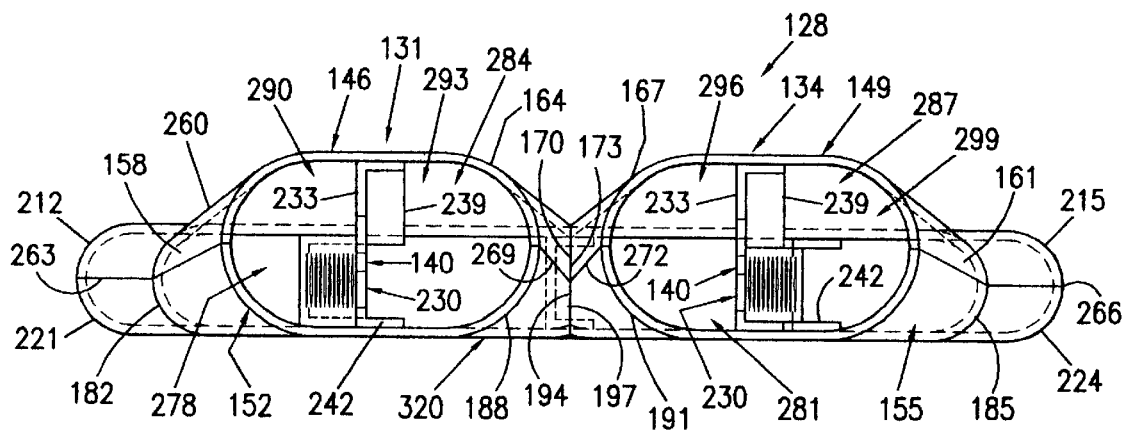
Figure 7:
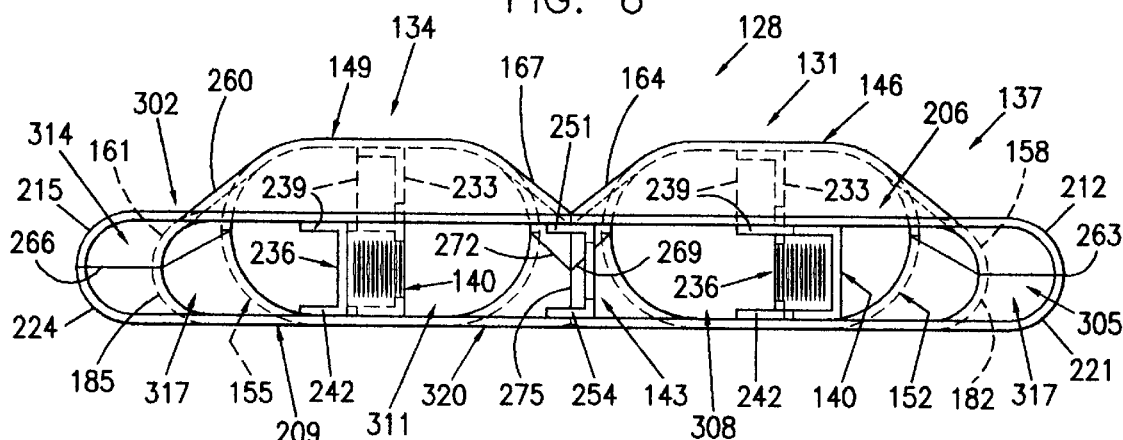
Figures 15, 15A, 15B:
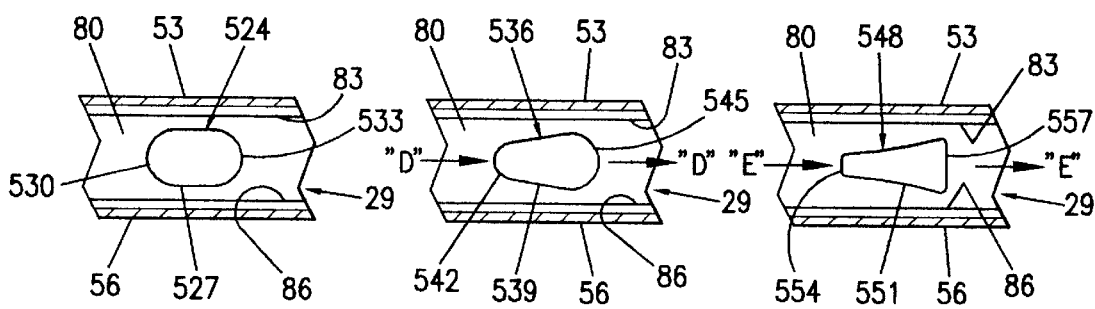

The best mode presently contemplated for carrying out the invention is illustrated in the accompanying drawings, in which:

FIG. 1 is a right front perspective view of a first embodiment of the exhaust pipe of the invention which has a single inlet pipe and two elongate passageways;

FIG. 2, a front elevational view taken on the line 2—2 of FIG. 1 showing the relative cross-sections of the exhaust pipe;

FIG. 3, a rear elevational view taken on the line 3—3 of FIG. 1 showing the relative cross-sections of the exhaust pipe;

FIG. 4, a longitudinal vertical sectional view taken on the line 4—4 of FIG. 1 showing a first version exhaust gas cross-over holes in the support rib;

FIG. 5, a right front perspective view of a second embodiment of the exhaust pipe of the invention which has dual inlet pipes and four elongate passageways;

FIG. 6, a front elevational view taken on the line 6—6 of FIG. 5 showing the relative cross-sections of the exhaust pipe;

FIG. 7, a rear elevational view taken on the line 7—7 of FIG. 5 showing the relative cross-sections of the exhaust pipe;

FIG. 8, a longitudinal vertical sectional view taken on the line 8—8 of FIG. 5 showing such first version exhaust gas cross-over holes in the right hand support rib;

FIG. 9, a longitudinal vertical sectional view taken on the line 9—9 of FIG. 5 showing such first version exhaust gas cross-over holes in the spacer rib;

FIG. 10, a right front perspective view of a third embodiment of the exhaust pipe of the invention which has dual inlet pipes and six elongate passageways;

FIG. 11, a front elevational view taken on the line 11—11 of FIG. 10 showing the relative cross-sections of the exhaust pipe;

FIG. 12, a rear elevational view taken on the line 12—12 of FIG. 10 showing the relative cross-sections of the exhaust pipe;

FIG. 13, a longitudinal vertical sectional view taken on the line 13—13 of FIG. 10 showing such first version exhaust gas cross-over holes in the right hand support rib;

FIG. 14, a longitudinal vertical sectional view taken on the line 14—14 of FIG. 10 showing such first version exhaust gas cross-over holes in the spacer rib;

FIG. 15, a fragmentary longitudinal vertical sectional view of a rib showing a second version exhaust gas crossover hole;

FIG. 15A, a fragmentary longitudinal vertical sectional view of a rib showing a third version exhaust gas cross-over hole, with the preferred direction of exhaust gas flow indicated by the arrows;

FIG. 15B, a fragmentary longitudinal vertical sectional view of a rib showing a fourth version exhaust gas cross over hole, with the preferred direction of exhaust gas flow indicated by the arrows;

FIG. 16, side elevational view of a race car having an eight cylinder engine and which has a single third embodiment exhaust pipe mounted thereto;

FIG. 17, a bottom plan view taken on the line 17—17 of FIG. 16 showing the primary exhaust pipes connecting to such third embodiment exhaust pipe, the mounting thereof to the chassis of the car, and with the portion thereof which is trimmed off to fit the exterior of the car indicated by phantom lines;

FIG. 18, a fragmentary lateral vertical sectional view taken on the line 18—18 of FIG. 17, rotated ninety degrees counter-clockwise, showing the details of the typical mounting of the exhaust pipe to the chassis of the car;

FIG. 19, a fragmentary bottom plan view of such race car having an eight cylinder engine and which has a pair of such first embodiment exhaust pipes mounted thereto, showing the primary exhaust pipes connecting to such first embodiment exhaust pipes, the mounting thereof to the chassis of the car, and with the portion of each thereof which is trimmed off to fit the exterior of the car indicated by phantom lines; and FIG. 20, a fragmentary bottom plan view of a race car having a six cylinder engine and which has a pair such of first embodiment exhaust pipes mounted thereto, showing the primary exhaust pipes connecting to such first embodiment exhaust pipes, the mounting thereof to the chassis of the car, and with the portion of each thereof which is trimmed off to fit the exterior of the car indicated by phantom lines.

DETAILED DESCRIPTION OF THE ILLUSTRATED EMBODIMENTS

Referring to FIGS. 1–4, therein is shown a first embodiment, single inlet, two passageway flat exhaust pipe 20 comprising an exhaust gas inlet 23, a body 26, and a structural rib 29. Inlet 23 comprises an upper front half shell 32 and a lower front half shell 35. Upper front half shell 32 is a single piece of formed sheet metal of a raised, half oval shape having downwardly rounded outside edge portions 38 and 41. A plurality of holes such as round plug weld holes 44 extend longitudinally along the center of upper front half shell 32. Lower front half shell 35 is a single piece of formed sheet metal of a half oval shape having upwardly rounded outside edge portions 47 and 50. A plurality of plug weld holes such as round plug weld holes (not shown) extend longitudinally along the center of lower front half shell 35. Body 26 comprises an upper rear half shell 53 and a lower rear half shell 56. Upper rear half shell 53 is a single piece of formed sheet metal of a tapered, flattened shape having downwardly rounded outside edge portions 59 and 62. A plurality of plug weld holes such as plug weld slots 65 extend longitudinally along the center of upper rear half shell 53. Lower rear half shell 56 is a single piece of formed sheet metal of a tapered, flattened shape having upwardly rounded outside edge portions 68 and 71. A plurality of plug weld holes such as plug weld slots (not shown) extend longitudinally along the center of lower rear half shell 56. Structural rib 29 is a single piece of sheet metal having a C-shaped channel cross-section, with a web 74 having a tapered exhaust gas inlet section 77 and a generally untapered mixing section 80 interconnecting a bent upper leg or flange 83 and a straight lower leg or flange 86 thereof. A plurality of first version round exhaust gas cross-over holes 89 extend through web 38.

A lateral circumferential weld seam 92, a pair of longitudinal outside weld seams 95 and 98, and plug welds (not shown) in the respective plug weld holes including round plug weld holes 44 and plug weld slots 65 secure rib 29 and half shells 32, 35, 53, and 56 together as exhaust pipe 20. Exhaust gases enter exhaust pipe 20 through an oval shaped inlet opening 101 of inlet 23 formed by upper and lower front half shells 32 and 35 into a main funnel passageway 104 formed thereby having a pair of individual passageways 107 and 110 interconnected by exhaust gas cross-over holes 89. Inlet 23 is typically welded to an exhaust pipe, collector, or header (not shown) so as to receive exhaust gasses from an internal combustion engine (not shown) through inlet opening 101. Such exhaust gasses continue on into a main mixing passageway 113 formed by upper and lower rear half shells 53 and 56 having individual passageways 116 and 119 interconnected by exhaust gas cross-over holes 89. Main funnel passageway 104 and main mixing passageway 113 allow the exhaust gasses to mix or combine and expand prior to exiting through a flattened outlet opening 122. A bottom surface 125 of exhaust pipe 20 lies in a plane "A" with upper and lower front half shells 32 and 35 angled upwardly so as to provide extra ground clearance. Upper and lower front half shells 32 and 35, upper and lower rear half shells 53 and 56, and structural rib 29 are typically made of sheet metal such as mild steel, stainless steel, or aluminum which is punched out of a sheet of metal and formed using a break or other comparable press.

Referring to FIGS. 5–9, therein is shown a second embodiment, dual inlet, four passageway flat exhaust pipe 128 comprising a pair of exhaust gas inlets 131 and 134, a body 137, a pair of structural ribs 140, and a spacer rib 143. Inlets 131 and 134 comprise respective upper front half shells 146 and 149 and respective lower front half shells 152 and 155. Upper front half shells 146 and 149 each are a single piece of formed sheet metal of a raised, half oval shape having respective downwardly rounded outside edge portions 158 and 161, and respective downwardly rounded inside edge portions 164 and 167 which are truncated at respective edges 170 and 173 so as to fit together. A plurality of round plug weld holes 176 and 179 extend longitudinally along the respective upper front half shells 146 and 149. Lower front half shells 152 and 155 each are a single piece of formed sheet metal of a raised, half oval shape having respective upwardly rounded outside edge portions 182 and 185, and respective upwardly rounded inside edge portions 188 and 191 which are truncated at respective edges 194 and 197 so as to fit together. A plurality of round plug weld holes (not shown) extend longitudinally along the respective lower front half shells 152 and 155. Body 137 comprises an upper rear half shell 206 and a lower rear half shell 209. Upper rear half shell 206 is a single piece of formed sheet metal of a tapered, flattened shape having downwardly rounded outside edge portions 212 and 215. A plurality of plug weld holes such as plug weld slots 218 extend longitudinally along upper rear half shell 206 in two rows. Lower rear half shell 209 is a single piece of formed sheet metal of a tapered, flattened shape having upwardly rounded outside edge portions 221 and 224. A plurality of plug weld holes such as plug weld slots (not shown) extend longitudinally along lower rear half shell 209 in two rows. Each structural rib 140 is a single piece of sheet metal having a C-shaped cross-section, with a web 230 having a tapered exhaust gas inlet section 233 and a generally untapered mixing section 236 interconnecting a bent upper leg or flange 239 and a straight lower leg or flange 242 thereof. A plurality of first version round exhaust gas cross-over holes 245 extend through web 230. Spacer rib 143 is a single piece of sheet metal having a C-shaped cross-section, with a web 248 interconnecting an upper leg or flange 251 and a lower leg or flange 254 thereof. A plurality of first version round exhaust gas cross-over holes 257 extend through web 248.

A lateral circumferential weld seam 260, a pair of outside weld seams 263 and 266, a pair of inside weld seams 269 and 272, a center weld seam 275, and plurality of plug welds (not shown) in the respective plug weld holes, including round plug weld holes 176 and 179, and plug weld slots 218, secure structural ribs 140, spacer rib 143, half shells 146, 149, 152, 155,206, and 209 together as exhaust pipe 128. Exhaust gases enter exhaust pipe 128 through a pair of oval shaped inlets 278 and 281 of inlets 131 and 134 formed by respective pairs of upper and lower front half shells 146 and 152, and 149 and 155 into respective main funnel passageways 284 and 287 formed thereby having pairs of individual passageways 290 and 293, and 296 and 299 interconnected by exhaust gas cross-over holes 245. Inlets 131 and 134 are typically welded to respective exhaust pipes, collectors, or headers (not shown) so as to receive exhaust gasses from an internal combustion engine (not shown) through the respective inlet openings 278 and 281. Such exhaust gasses continue on into a main mixing passageway 302 formed by upper and lower rear half shells 206 and 209 having four individual passageways 305, 308, 311, and 314 interconnected by exhaust gas cross-over holes 245 and 257. Main funnel passageways 284 and 287, and main mixing passageway 302 allow the exhaust gasses to mix or combine and expand prior to exiting through a flattened outlet opening 317. A bottom surface 320 of exhaust pipe 128 lies in a plane "B" with inlets 131 and 134 angled upwardly so as to provide extra ground clearance. Upper front half shells 146 and 149, lower front half shells 152 and 155, upper and lower rear half shells 206 and 209, structural ribs 140, and spacer rib 143 are typically made of sheet metal such as mild steel, stainless steel, or aluminum which is punched out of a sheet of metal and formed using a break or other comparable press.

Referring to FIGS. 10–14, therein is shown a third embodiment, dual inlet, six passageway flat exhaust pipe 323 comprising a pair of inlets 326 and 329, a body 332, a pair of structural ribs 335, and three spacer ribs 338. Inlets 326 and 329 comprise respective upper front half shells 341 and 344 and respective lower front half shells 347 and 350. Upper front half shells 341 and 344 each are a single piece of formed sheet metal of a raised, half oval shape having respective downwardly rounded outside edge portions 353 and 356, and respective downwardly rounded inside edge portions 359 and 362 which are truncated at respective edges 365 and 368 so as to fit together. A plurality of round plug weld holes 371 and 374 extend longitudinally along the respective upper front half shells 341 and 344. Lower front half shells 347 and 350 each are a single piece of formed sheet metal of a raised, half oval shape having respective upwardly rounded outside edge portions 377 and 380, and respective upwardly rounded inside edge portions 383 and 386 which are truncated at respective edges 389 and 392 so as to fit together. A plurality of round plug weld holes (not shown) extend longitudinally along the respective centers of lower front half shells 347 and 350. Body 332 comprises an upper rear half shell 401 and a lower rear half shell 404. Upper rear half shell 404 is a single piece of formed sheet metal of a tapered, flattened shape having downwardly rounded outside edge portions 407 and 410. A plurality of plug weld holes such as plug weld slots 413 extend longitudinally along upper rear half shell 401 in four rows. Lower rear half shell 404 is a single piece of formed sheet metal of a tapered, flattened shape having upwardly rounded outside edge portions 416 and 419. A plurality of plug weld holes such as plug weld slots (not shown) extend longitudinally along lower rear half shell 404 in four rows. Each structural rib 335 is a single piece of sheet metal having a C-shaped cross-section, with a web 425 having a tapered exhaust gas inlet section 428 and a generally untapered mixing section 431 interconnecting a bent upper leg or flange 434 and a straight lower leg or flange 437 thereof. A plurality of first version round exhaust gas cross-over holes 440 extend through web 425. Each spacer rib 338 is a single piece of sheet metal having a C-shaped cross-section, with a web 443 interconnecting an upper leg or flange 446 and a lower leg or flange 449 thereof. A plurality of first version round exhaust gas cross-over holes 452 extend through web 443.

A lateral circumferential weld seam 455, a pair of outside weld seams 458 and 461, a pair of inside weld seams 464 and 467, a center weld seam 470, and plurality of plug welds (not shown) in the respective plug weld holes, including round plug weld holes 371, 374, and plug weld slots 413 secure structural ribs 335, spacer ribs 338, half shells, 341, 344, 347, 350, 401, and 404 together as exhaust pipe 323. Exhaust gases enter exhaust pipe 323 at a pair of oval shaped inlet openings 473 and 476 of inlets 326 and 329 formed by respective pairs of upper and lower front half shells 341 and 347, and 344 and 350 into respective main funnel passageways 479 and 482 formed thereby having pairs of individual passageways 485 and 488, and 491 and 494 interconnected by exhaust gas cross-over holes 440. Inlets 326 and 329 are typically welded to respective exhaust pipes, collectors, or headers (not shown) so as to receive exhaust gasses from an internal combustion engine (not shown) through the respective inlet openings 473 and 476. Such exhaust gasses continue on into a main mixing passageway 497 formed by upper and lower rear half shells 401 and 404 having six individual passageways 500, 503, 506, 509, 512, and 515 interconnected by exhaust gas cross-over holes 340 and 352. Main funnel passageways 479 and 482, and main mixing passageway 497 allow the exhaust gasses to mix or combine and expand prior to exiting through a flattened outlet opening 518. A bottom surface 521 of exhaust pipe 323 lies in a plane "C" with inlets 326 and 329 angled upwardly so as to provide extra ground clearance. Upper front half shells 341 and 344, lower front half shells 347 and 350, upper and lower rear half shells 401 and 404, structural ribs 335, and spacer ribs 338 are typically made of sheet metal such as mild steel, stainless steel, or aluminum which is punched out of a sheet of metal and formed using a break or other comparable press.

Referring to FIG. 15, therein is shown a second version exhaust gas cross-over hole 524 in structural rib 29 also for use in any of the other structural ribs 140 and 335, and in spacer ribs 143 and 338. An elongate, straight-sided portion 527 between round ends 530 and 533 thereof allow more crossover of exhaust gasses than hole 89 of the same diameter as round ends 530 and 533. In FIG. 15A is shown a third version exhaust gas cross-over hole 536 which is generally of teardrop shape in structural rib 29 also for use in any of the other structural ribs 140 and 335, and in spacer ribs 143 and 338. An elongate straight-sided, tapered portion 539 between small and large round ends 542 and 545 thereof allow more cross-over of exhaust gasses than exhaust gas cross-over hole 524 due to a smoother transition of exhaust gasses moving in the direction of arrows "A" than that of exhaust gas cross-over hole 524. In FIG. 15B is shown a fourth version exhaust gas cross-over hole 548 which is generally of polygonal shape in structural rib 29 also for use in any of the other structural ribs 140 and 335, and in spacer ribs 143 and 338. An elongate, inwardly curved-sided tapered portion 551 between small and large flat ends 554 and 557 thereof allow even more cross-over of exhaust gasses than exhaust gas crossover hole 536 due to a an even smoother transition of exhaust gasses moving in the direction of arrows "B" than that of exhaust gas cross-over hole 536, which hole 548 is similar in configuration to the low drag air inlet designed by NASA and used on aircraft.

Referring to FIGS. 16–18, therein is shown a typical installation of a single dual inlet exhaust pipe 323 to a race car comprising a stock car 560. Stock car 560 includes a body 563 mounted on or integral with a frame or chassis 566 with a plurality of wheels 569. An eight cylinder internal combustion engine 572 powers stock car 560 through a drive train 575. Stock cars generally race on oval tracks in a counter-clockwise rotational direction leaning toward the outside of the turn, or the right side 578 of stock car 560. Therefore, the greatest clearance between chassis 566 of stock car 560 and the track or ground surface 581 results on the left side 584 of stock car 560. As such exhaust pipe 323 (as well as dual inlet exhaust pipe 128) are typically mounted to the left side 584 of stock car 560 under chassis 566. Note, however, in some situations the combination of ride height, type of track, and the design of the suspension and the stiffness thereof, the dual inlet boom tube exhaust pipe 323 and secondary exhaust pipes 605 and 608 might be reversed such that boom tube exhaust pipe 323 exits from the outside, or right hand side 578 of stock car 560. Exhaust gasses from engine 572 exit from engine 572 through a pair of left and right side headers 587 and 590 comprising a plurality of left and right side primary exhaust pipes 593 and 596 which merge into respective left and right side merge collectors 599 and 602. A pair of left and right side secondary exhaust pipes 605 and 608 are connected at respective ends 611 and 614 thereof to respective collectors 599 and 602 and at respective opposite ends 617 and 620 thereof to inlets 326 and 329 of exhaust pipe 323 such as by means of clamping or welding. Body 332 of exhaust pipe 323 is attached to chassis 566 of stock car 560 such as by means of a strap 623 which extends diagonally across body 332 and attaches such as to a main member 632 of chassis 566 such as by means of a pair of bolts 635 disposed in a pair of threaded holes (not shown) therein. Exhaust pipe 323 is thus supported by secondary exhaust pipes 605 and 608 connected to respective headers 587 and 590 connected to engine 572, and by means of strap 623 immediately under chassis 566, and combined with a thin profile and flat bottom surface 521 provides maximum ground clearance "C" while maintaining an adequate cross-sectional area for exhaust gasses to exit through flattened outlet opening 518 so as to not create an unacceptable amount of exhaust gas backpressure lowering the power output of engine 572. Body 332 of exhaust pipe 323 is trimmed to fit the particular stock car 560 as at edge 638 removing the remaining portion 641 (dotted lines). An optional H-pipe or exhaust gas crossover pipe 642 can be welded, or removably connected by means of welding standard fittings (not shown), to connect a pair of holes (not shown) one in the side of each of secondary exhaust pipes 605 and 608. Crossover pipe 642 allows exhaust gasses to crossover between secondary exhaust pipes 605 and 608 to better balance the exhaust gas pressures therein during the firing of the cylinders of engine 572 dumping exhaust gasses alternately through headers 587 and 590 through respective secondary exhaust pipes 605 and 608 as to reduce exhaust gas backpressure to engine 572 by allowing more efficient exiting of exhaust gasses.

Referring to FIG. 19, therein is shown a typical installation of a pair of single inlet exhaust pipes 20 to the same stock car 560 having eight cylinder gasoline engine 572. While the greatest clearance between chassis 566 of stock car 560 and the ground surface 581 results on the left side 584 of stock car 560, it may be desirable on certain stock cars 560, for certain race tracks, or for certain races to use such dual exhaust pipes 20 which extend from both the right and left sides 578 and 584 under chassis 566 of stock car 560. Exhaust gasses from engine 572 exit therefrom through a pair of left and right side headers 587 and 590 comprising a plurality of left and right side primary exhaust pipes 593 and 596 which merge into respective left and right side merge collectors 599 and 602. A pair of secondary exhaust pipes 644 and 647 are connected at respective ends 650 and 653 thereof to respective collectors 599 and 602 and at respective opposite ends 656 and 659 thereof to inlets 23 of respective exhaust pipes 20 such as by means of clamping or welding. Bodies 22 of respective exhaust pipes 20 are attached to chassis 566 of stock car 560 such as by means of straps 662 and 665 which extend diagonally across respective bodies 22 and attach such as to main member 632 and a main member 671, respectively, of chassis 566 such as by means of a pair of bolts 674 disposed in respective pairs of threaded holes (not shown) therein. Exhaust pipes 20 are thus supported by secondary exhaust pipes 644 and 647 by respective straps 662 and 665 immediately adjacent chassis 566 and combined with a thin profile and flat bottom surface 125 provides maximum ground clearance without an unacceptable amount of exhaust gas back-pressure. Bodies 22 of exhaust pipes 20 are trimmed to fit the particular stock car 560 as at respective edges 677 and 680 removing the respective remaining portions 683 and 686 (dotted lines). An optional H-pipe or exhaust gas crossover pipe 687 can be welded, or removably connected by means of welding standard fittings (not shown), to connect a pair of holes (not shown) one in the side of each of secondary exhaust pipes 644 and 647. Crossover pipe 687 allows exhaust gasses to crossover between secondary exhaust pipes 644 and 647 to better balance the exhaust gas pressures therein during the firing of the cylinders of engine 572 dumping exhaust gasses alternately through headers 587 and 590 through respective secondary exhaust pipes 644 and 647 as to reduce exhaust gas backpressure to engine 572 by allowing more efficient exiting of exhaust gasses.

Referring to FIG. 20, therein is shown a typical installation of a pair of single inlet exhaust pipe 20 to a stock car 689. Stock car 689 includes a body 692 mounted on or integral with a frame or chassis 695 with a plurality of wheels 698. A six cylinder gasoline engine 701 powers stock car 689 through a drive train 704. Exhaust gasses from engine 701 exit therefrom through a pair of left and right side headers 707 and 710 comprising a plurality of left and right side primary exhaust pipes 713 and 716 which merge into respective left and right side merge collectors 719 and 722. A pair of secondary exhaust pipes 725 and 728 are connected at respective ends 731 and 734 thereof to respective collectors 719 and 722 and at respective opposite ends 737 and 740 thereof to inlets 23 of respective exhaust pipes 20 such as by means of clamping or welding. Bodies 22 of respective exhaust pipes 20 are attached to chassis 695 of stock car 689 such as by means of straps 662 and 665 as described above which attach such as to a pair of respective main members 743 and 746 of chassis 695 such as by means of bolts 674 disposed in respective pairs of threaded holes (not shown) therein. Exhaust pipes 20 are thus supported by secondary exhaust pipes 725 and 728 by respective straps 662 and 665 immediately adjacent chassis 695 and combined with a thin profile and flat bottom surface 125 provides maximum ground clearance without an unacceptable amount of exhaust gas back-pressure. Bodies 22 of exhaust pipes 20 are trimmed to fit the particular stock car 689 as at respective edges 749 and 752 removing the respective remaining portions 755 and 758 (dotted lines). An optional H-pipe or exhaust gas crossover pipe 759 can be welded, or removably connected by means of welding standard fittings (not shown), to connect a pair of holes (not shown) one in the side of each of secondary exhaust pipes 725 and 728. Crossover pipe 759 allows exhaust gasses to crossover between secondary exhaust pipes 725 and 728 to better balance the exhaust gas pressures therein during the firing of the cylinders of engine 701 dumping exhaust gasses alternately through headers 707 and 710 through respective secondary exhaust pipes 725 and 728 as to reduce exhaust gas backpressure to engine 701 by allowing more efficient exiting of exhaust gasses.

The boom tubes, the sheet metal construction thereof, exhaust systems which use the boom tubes, and the method of constructing the boom tubes, all comprise the inventive concept of the invention with many variations thereof possible while still staying within the overall inventive concept. Examples include, but are not limited to boom tubes constructed of a single sheet metal tube which is formed into the appropriately shaped inlet and body or constructed of separate inlet and body tubes which are formed and welded or clamped together, such forming being done such as by forcing appropriately shaped internal arbors or dies into the ends thereof such as by using a hydraulic press, and/or by using appropriately shaped external dies and forms. The inlets and bodies can be a single thin casting or separate castings welded, bolted, or otherwise connected together and can contain one or more ribs such as flat plate ribs or extruded metal ribs of a C-shaped channel cross-section, Z-shaped cross-section or other such cross-section. The sheet metal versions can have peripheral welds which are metal inert Gas (MIG), tungsten inert gas (TIG), stick, or otherwise welded together in a continuous or intermittent weld. Likewise, the sheet metal versions can be spot welded together at the joints of the half shells and the ribs, and at the outer periphery of the half shells if modified to include outwardly extending flanges which are spot welded together rather than having peripheral welds which are otherwise welded. While the structural rib typically extends into an inlet so as to provide a stronger structure for the boom tube exhaust pipe, such rib does not necessarily need to do so. Likewise, the portion of the structural rib which extends into an inlet need not be vertically tapered and can be affixed to only an upper or lower inside surface of the inlet, such rib being less costly to manufacture than a tapered rib yet providing some additional support to the inlet. The spacer ribs and the structural ribs provide support to the sheet metal half shells so as to minimize metal fatigue and subsequent exhaust pipe failure due thereto. While the boom tubes are typically made of mild steel or stainless steel, other metals such as aluminum can be used. Likewise, the half shells can be made of composite materials of resin and cloth which are laid up in an appropriately shaped mold, and the ribs comprise pultrusions of a composite material of resin and cloth. Such composite parts can be coated with a heat reflective metal sheeting or sprayed such as with an alumina slurry to form a solid ceramic alumina coating to lower the temperature to which the composite material is subjected. Likewise, metal components can be coated such as with the ceramic alumina to shield the metal from the heat and to keep the floorboard and driver's compartment of the car cooler for driver comfort. Metal ribs can be made of several individual pieces such as of sheared or punched sheet metal, or extruded metal which is welded, riveted, bolted, or otherwise connected together. The exhaust cross-over holes can be of the same size or of varying size such as along the tapered portion of web of the rib. The half shells can be asymmetrical in cross-section, have overlapping lateral or longitudinal edges, be left and right halves rather than upper and lower halves, be made of a single stamp formed piece of sheet metal which includes halves of the inlet and body together, include integrally stamp formed ribs therein which can be spot welded to the mating half shell or mating ribs thereof which extend only partway vertically through the body and/or inlet of the boom tube exhaust pipe. The dual inlets can be integrally formed together and with the body from a single piece half shell of sheet metal. Likewise, the dual inlets can be integrally formed from a single piece of sheet metal and the body from a separate piece of sheet metal, which pieces are welded together to form a single half shell. The inlet and body can be fabricated from separate formed pieces of sheet metal which can be made to overlap at respective edges thereof and spot welded together. Mounting brackets such as made of metal can be welded, strapped, bolted, or otherwise affixed to the tubular inlet and/or body in place of or in addition to the mounting straps to mount the boom tube exhaust pipe to the frame or the chassis of the car such as by using bolts or other fasteners. Likewise, additional straps can be used or the straps moved to a different location. While the body of the boom tube exhaust pipe is typically flared laterally outwardly to allow the exhaust gasses to expand without decreasing ground clearance, the body can be flared in the vertical direction if desired or needed for the particular application. While the boom tube exhaust pipe is constructed from upper and lower half shells, left and right half shells, half shells which are asymmetrical, or which individually cover more or less than half of the circumference of the completed boom tube exhaust pipe. The number and position of the spacer ribs can be modified as needed to provide the strength, and vibration and fatigue resistance as needed to suit the particular application. Likewise, the gage of sheet metal used can be matched to the particular application with lower skid plates added to protect vulnerable portions of the boom tube exhaust pipe from abrasion from contact with the race track and from damage due to contact with debris on the race track. Rods and other types of reinforcing members can span between the upper and the lower half shells in addition to or in place of the ribs in certain applications of the boom tube exhaust pipe.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:
1. A method of constructing a boom tube exhaust pipe, comprising the steps:
providing a pair of upper and lower half shells of formed sheet metal which include an inlet portion, a body portion, and an outer periphery;
providing an elongate rib of formed sheet metal having a web which interconnects an upper and a lower flange which extend laterally therefrom;
placing the rib generally longitudinally within the half shells;
welding the respective upper and lower ribs to the half shells; and
welding the outer peripheries of the half shells together.
2. A method according to claim 1, wherein the half shells each include a plurality of generally longitudinally extending plug weld holes punched therethrough, and the step of welding the respective upper and lower half shells to the rib is done by plug welding through the plug weld holes.
3. A method according to claim 1, wherein the step of welding the respective upper and lower half shells to the rib is done using resistance spot welding.
4. A method according to claim 1, wherein each of the upper and lower half shells comprise inlet and body halves and further comprising the step of welding the respective inlet and body halves together.
5. A method according to claim 1, wherein the step of providing a pair of upper and lower half shells of formed sheet metal includes providing a pair of such upper and lower half shells each of which include a pair of inlet portions, the step of providing an elongate rib of formed sheet metal includes providing two of such ribs, the step of placing the rib generally longitudinally within the half shells includes placing two of such ribs, the step of welding the respective upper and lower ribs to the half shells includes welding two of such ribs, and the step of welding the outer peripheries of the half shells together includes welding the periphery between the inlets halves of the upper and lower half shells.
6. A method according to claim 5, wherein each of the upper and lower half shells comprise inlet and body halves and further comprising the step of welding the respective inlet and body halves together.
7. A method according to claim 6, wherein the inlet halves of the upper and lower half shells are made from separate pieces of sheet metal.
8. A method according to claim 7, wherein the inlet halves of the upper and lower half shells are vertically cut so as to mate together laterally and the step of welding the outer peripheries of the half shells together includes welding the periphery between the inlets halves of the upper and lower half shells.
9. A method according to claim 5, further comprising the steps of providing an elongate center spacer rib of formed sheet metal having a web which interconnects an upper and a lower flange which extend laterally therefrom which spacer rib extends generally longitudinally through the body, placing the rib generally longitudinally within the half shells generally laterally centered therein between the respective inlets, and welding the spacer rib to the upper and lower half shells.
10. A method according to claim 9, further comprising the steps of providing a pair of elongate lateral spacer ribs of formed sheet metal each having a web which interconnects an upper and a lower flange which extend laterally therefrom which spacer rib extends generally longitudinally through the body, placing the ribs generally longitudinally within the half shells each disposed laterally outside one of the respective structural ribs, and welding the spacer rib to the upper and lower half shells.

* * * * *